(12) United States Patent
Kim

(10) Patent No.: US 10,347,902 B2
(45) Date of Patent: Jul. 9, 2019

(54) FABRICATING METHOD OF LITHIUM ELECTRODE AND LITHIUM SECONDARY BATTERY INCLUDING THE SAME

(71) Applicant: SK Innovation Co., Ltd., Seoul (KR)

(72) Inventor: Min-Seong Kim, Daejeon (KR)

(73) Assignee: SK Innovation Co., Ltd., Seoul (KR)

(*) Notice: Subject to any disclaimer, the term of this patent is extended or adjusted under 35 U.S.C. 154(b) by 835 days.

(21) Appl. No.: 14/951,933

(22) Filed: Nov. 25, 2015

(65) Prior Publication Data
US 2016/0156018 A1    Jun. 2, 2016

(30) Foreign Application Priority Data

Nov. 28, 2014  (KR) .......................... 10-2014-0168388

(51) Int. Cl.
| | | |
|---|---|---|
| H01M 4/04 | (2006.01) | |
| H01M 4/1391 | (2010.01) | |
| H01M 4/1393 | (2010.01) | |
| H01M 4/131 | (2010.01) | |
| H01M 4/133 | (2010.01) | |
| H01M 4/36 | (2006.01) | |
| H01M 4/62 | (2006.01) | |

(52) U.S. Cl.
CPC ....... *H01M 4/0435* (2013.01); *H01M 4/0404* (2013.01); *H01M 4/1391* (2013.01); *H01M 4/1393* (2013.01); *H01M 4/131* (2013.01); *H01M 4/133* (2013.01); *H01M 4/366* (2013.01); *H01M 4/625* (2013.01)

(58) Field of Classification Search
None
See application file for complete search history.

(56) References Cited

U.S. PATENT DOCUMENTS

2013/0260214 A1* 10/2013 Ueda ................. H01M 10/0585
429/162

* cited by examiner

Primary Examiner — Sarah A. Slifka
(74) Attorney, Agent, or Firm — The Webb Law Firm

(57) ABSTRACT

The present invention provides a fabricating method of a lithium electrode, a lithium electrode, and a lithium secondary battery including the same, the fabricating method including: a) forming an active material layer on one surface or active material layers on both surfaces of a current collector; b) forming a conductive fiber structure layer in a frame form on a surface of the active material layer; and c) pressing the current collector on which the conductive fiber structure layer in a frame form is formed. Since breakage of the active materials caused by pressing is prevented by the conductive fiber structure layer in a frame form, the present invention provides a lithium electrode capable of maintaining electronic conductivity between active material particles and having a long lifespan and high-rate charge and discharge characteristics.

8 Claims, 3 Drawing Sheets

FABRICATING METHOD OF LITHIUM ELECTRODE AND LITHIUM SECONDARY BATTERY INCLUDING THE SAME

CROSS-REFERENCE TO RELATED APPLICATION

This application claims priority to Korean Patent Application No. 10-2014-0168388 filed Nov. 28, 2014, the disclosure of which is hereby incorporated in its entirety by reference.

BACKGROUND

1. Technical Field

The present invention relates to a fabricating method of a lithium electrode, a lithium electrode, and a lithium secondary battery including the same.

2. Description of the Related Art

A lithium battery may be classified into a lithium primary battery and a lithium secondary battery depending on whether or not the battery is rechargeable. The lithium primary battery uses lithium for an anode, and is classified depending on kinds of a cathode. However, the lithium primary battery has a disadvantage in that a utilization rate of an electrode is deteriorated due to non-uniformity of potential distribution caused by a localized dissolution reaction of a lithium electrode.

Meanwhile, the lithium secondary battery has a structure in which a non-aqueous electrolyte including a lithium salt is impregnated in an electrode assembly including a cathode, an anode, and a porous separator interposed therebetween, wherein the cathode and the anode are applied with a cathode active material and an anode active material, respectively, on a current collector. Examples of the cathode active material applied to the cathode mainly include lithium cobalt oxide, lithium manganese oxide, lithium nickel oxide, lithium composite oxide, and the like, and examples of the anode active material applied to the anode include a carbon-based material, and the like. The lithium secondary battery has been actively researched in order to increase energy density of the battery.

In order for the lithium secondary battery to exhibit high energy density, a method of coating a slurry on an aluminum as the cathode and a copper foil as the anode, the slurry including increased weight of active materials per unit gram, drying the coated slurry, and a press process such as a roll press process, or the like, to increase electronic conductivity among the active materials, thereby improving long lifespan and high-rate charge and discharge characteristics, has been commonly performed.

However, when the electrodes are pressed by a roll press, or the like, the active materials are broken by the roll and the electrode in contact to each other, and accordingly, pressure is delivered to an inner side, whereby particles of the active materials are continuously destroyed toward the foil. FIG. 1 is scanning electron microscope (SEM) images each illustrating the particle breakage. Description regarding this is provided again in the detailed description of the present invention below.

Eventually, deterioration of the electrode occurs from the outermost layer of the electrode layer, which reduces electronic conductivity among the active material particles, and causes increase in resistance of the cathode and the anode, and lithium deposition due to side reactions, such that desirable long lifespan and high-rate charge and discharge characteristics may not be obtained.

Nevertheless, the roll press process of the electrode is an essential process, which is inevitably applied in order to maintain the electronic conductivity among the entire inner active materials, even if damage to some of active material particles from a surface may occur. Therefore, necessity of a technology of preventing damage to the active material particles after the roll press process has been increased.

BRIEF SUMMARY

It is an aspect of the present invention to provide a fabricating method of a lithium electrode capable of preventing breakage of active materials caused by a roll-press process to maintain electronic conductivity among active material particles and to have excellent long lifespan and high-rate charge and discharge characteristics, a lithium electrode fabricated by the fabricating method, and a lithium secondary battery including the same.

The present invention is not limited to the above aspect and other aspects of the present invention will be clearly understood by those skilled in the art from the following description.

In accordance with one aspect of the present invention, a fabricating method of a lithium electrode, includes:

a) forming an active material layer on one surface or active material layers on both surfaces of the current collector;

b) forming a conductive fiber structure layer in a frame form on a surface of the active material layer; and c) pressing the current collector on which the conductive fiber structure layer in a frame form is formed.

The active material layer of step a) may be formed by applying and drying a slurry including electrode active materials.

The conductive fiber structure layer of step b) may be formed by applying and drying a slurry including a fibrous conductive material.

The fibrous conductive material may be a carbon nanotube or a carbon nanofiber having a diameter of 10 to 200 nm, a length of 3 to 100 μm, and a surface area of 20 to 200 $m^2/g$.

In addition to the fibrous conductive material, the slurry may further include at least one conductive mixture selected from the group consisting of carbon-based conductive materials, electrode active materials, transition metal oxides and phosphate-based transition metal oxides.

The carbon-based conductive material may include one selected from the group consisting of graphite, acetylene black, carbon black, Ketjen black, channel black, furnace black, lamp black, thermal black and carbon fluoride, or mixtures of two or more thereof.

The slurry including the fibrous conductive material may include 1 to 80 parts by weight of a conductive material relative to 100 parts by weight of the fibrous conductive material.

The pressing of step c) may be performed by high densification with a pressure of 10 $kg/cm^2$ to 100 $ton/cm^2$ using a roll press or a plate press.

In accordance with another aspect of the present invention, there is provided a lithium electrode fabricated by the fabricating method as described above.

In accordance with still another aspect of the present invention, there is provided a lithium secondary battery including the lithium electrode as described above.

DETAILED DESCRIPTION

Hereinafter, embodiments of the present invention will be described in detail with reference to the accompanying drawings. It should be understood that the present invention is not limited to the following embodiments, and that the embodiments are provided for illustrative purposes only. The scope of the invention should be defined only by the accompanying claims and equivalents thereof.

The present inventors have been made in an effort to prevent breakage of active materials caused by a press process according to the related art and completed the present invention. A roll press process of electrodes in the press process is an essential process, but breakage of the electrode active material inevitably occurs in the roll press process, which causes damage to some of active material particles from a surface.

Figure 1:
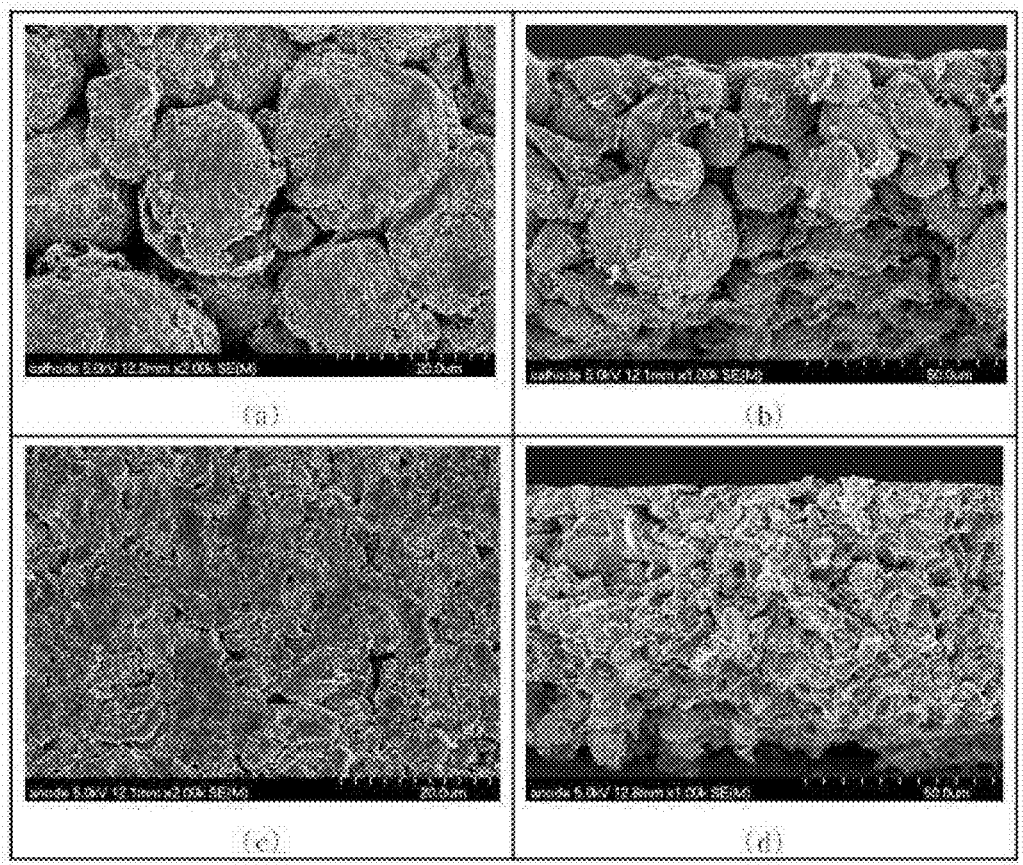
FIG. 1 is scanning electron microscope (SEM) images each illustrating breakage of active materials of a lithium electrode by a press process, where part (a) of FIG. 1 illustrates an image illustrating a surface of a cathode active material broken by the press process of a cathode active material layer, part (b) of FIG. 1 illustrates an image illustrating a side surface of the cathode active material broken by the press process of the cathode active material layer, part (c) of FIG. 1 illustrates an image illustrating a surface of an anode active material broken by a press process of an anode active material layer, and part (d) of FIG. 1 illustrates an image illustrating a side surface of the anode active material broken by the press process of the anode active material layer.

FIG. 1 illustrates images of breakage of the active materials caused by a press process. Part (a) of FIG. 1 illustrates a surface of a cathode active material broken by the press process of a cathode active material layer, which may be confirmed that crack and breakage occur on the surface of particles. Breakage of the active material illustrated in part (b) of FIG. 1 has been regarded as a sacrifice for maintaining electronic conductivity among entire inner active materials. The breakage of the active materials may cause an increase in surface area of active material particles, and may increase a reaction between the active material particles and non-aqueous electrolyte, thereby forming a coating as a decomposition product, such that interfacial resistance between the active materials and the non-aqueous electrolyte is increased, whereby charge-discharge cycle life of a battery may be reduced. Part (b) of FIG. 1 illustrates the side surface of the cathode active material broken by the press process of the cathode active material layer, which may be confirmed that particle breakage is moved from the upper most part to a copper foil at the bottom. Part (c) of FIG. 1 illustrates a surface of an anode active material broken by a press process of an anode active material layer, which may be confirmed that the anode having a weaker strength than that of the cathode exhibits breakage of surface particles larger than that of the cathode. Part (d) of FIG. 1 illustrates a side surface of the anode active material broken by the press process of the anode active material, which may be confirmed that particle breakage is moved from the upper most part to copper foil at the bottom.

The present inventors researched to overcome the above-described problems for several years, and as a result, found a fabricating method according to the present invention including: forming a conductive fiber structure layer in a frame form before pressing an electrode using a roll press, and the like, thereby preventing breakage of active materials, the fabricating method being capable of not only preventing the breakage of active materials while increasing density among the active materials by the press processes such as a roll press process, and the like, thereby increasing efficiency of the electrode, and completed the present invention.

The present invention provides a fabricating method of a lithium electrode, including:

a) forming an active material layer on one surface or active material layers on both surfaces of the current collector;

b) forming a conductive fiber structure layer in a frame form on a surface of the active material layer; and c) pressing the current collector on which the conductive fiber structure layer in a frame form is formed.

Hereinafter, each step of the fabricating method according to the present invention is described in more detail.

First, step a) is a step of forming an active material layer on one surface or active material layers on both surfaces of the current collector, which may be performed by general methods known in the art. Depending on the cathode and the anode, each current collector may be used. The current collector is not specifically limited as long as it has high conductivity without causing chemical change in the battery, and may include stainless steel, aluminum, nickel, titanium, sintered carbon, copper, or materials surface-treated with carbon, nickel, titanium, silver, and the like, on a surface of aluminum or stainless steel. The current collector generally has a thickness of 3 to 50 µm. The current collector may be provided with fine concavo-convex on a surface thereof to increase adhesion the cathode active material, and may have various forms such as films, sheets, foils, nets, porous structures, foams and non-woven materials. According to an exemplary embodiment of the present invention, an aluminum foil is used as a cathode current collector, and a copper foil was used as an anode current collector.

In step a), the active material layer(s) is formed on one surface or both surfaces of the current collector, wherein the active material layer may be fabricated by applying and drying a slurry including an electrode active material.

The slurry including the electrode active material may be prepared by including each active material depending on the cathode and the anode, a conductive material, a binder, and a solvent. Here, all components except for the solvent are defined as a solid of the slurry. The active material may be classified into a cathode active material and an anode active material according to a cathode and an anode, respectively. Examples of the cathode active material may include Li.Mn-based composite oxides such as $LiMn_2O_4$, and the like, Li.Co-based composite oxides such as $LiCoO_2$, and the like, Li.Ni-based composite oxides such as $LiNiO_2$, and the like, Li.Ni.Co.Mn-based composite oxides such as $LiNiCoMnO_2$, and the like, Li.Fe-based composite oxides such as $LiFeO_2$, and the like, $Li_xCoO_2$, $Li_xNiO_2$, $MnO_2$, $LiMnO_2$, $Li_xMn_2O_4$, $LiMn_{2-y}O_4$, $\alpha\text{-}V_2O_5$, $TiS_2$ (x is an integer of 1 to 4, $0<y<2$), and the like. The anode active material may include one selected from the group consisting of carbons and graphite materials such as natural graphite, artificial graphite, expanded graphite, carbon fiber, non-graphitizable carbon, carbon black, carbon nanotube, fullerene, activated carbon; compounds containing metals and elements such as Al, Si, Sn, Ag, Bi, Mg, Zn, In, Ge, Pb, Pd, Pt, Ti, and the like, that are usable as alloys with lithium; composites of metals, compounds thereof, carbons and graphite materials; crystalline carbon, amorphous carbon, silicon-based active material, tin-based active material, and silicon-carbon-based active material as well as lithium-containing nitride, or combinations of two or more thereof.

The conductive material is a component for further improving conductivity of the electrode active material, and may have a content of 1 to 20 wt % relative to a total solid content of the slurry, but the content of the conductive material is not limited thereto. The conductive material is not specifically limited as long as conductivity is exhibited without causing chemical changes in batteries. Examples of the conductive material may include as graphite such as natural graphite, artificial graphite, or the like; carbon black such as carbon black, acetylene black, Ketjen black, channel black, furnace black, lamp black, thermal black, or the like; conductive fiber such as carbon fiber, metallic fiber, or the like; metal powder such as carbon fluoride powder, aluminum powder and nickel powder, or the like; conductive whiskers such as zinc oxide, potassium titanate, or the like; conductive metal oxide such as titanium oxide, or the like; conductive material such as polyphenylene derivative, or the like.

The binder is a component assisting in binding of the active materials and the conductive material and binding with the current collector, and may have a content of 1 to 50 wt % relative to the total solid content of slurry, but the content of the binder is not limited thereto. Examples of the binder may include polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber, fluorine rubber, various copolymers thereof, and the like.

The solvent may be any general solvent known in the art, and may preferably include N-methyl-2-pyrrolidone (NMP, boiling point: 202° C.), dimethylformamide (DMF, boiling point: 153° C.), dimethylacetamide (boiling point: 165° C.), water (boiling point: 100° C.), methyl ethyl ketone (boiling point: 79.5° C.), tetrahydrofuran (boiling point: 66° C.), acetone (boiling point: 56.3° C.), ethanol (boiling point: 78.3° C.), ethyl acetate (boiling point: 76.8° C.), and the like. The solvent may be applied with variously desirable concentrations relative to 100 parts by weight of solid content in slurry. Specifically, the solvent may have an amount of 10 parts by weight to 1,000 parts by weight, but the amount of the solvent is not limited thereto.

The prepared slurry may be uniformly applied and dried on the current collector, thereby forming the active material layer. The slurry may be applied at a thickness of 20 to 500 µm by general coating methods, and dried at a temperature of 50 to 200° C. Here, a decompression step may be included after the slurry is applied.

Next, step b) is described. The step b) is a step of forming a conductive fiber structure layer in a frame form on a surface of the active material layer.

Figure 3:
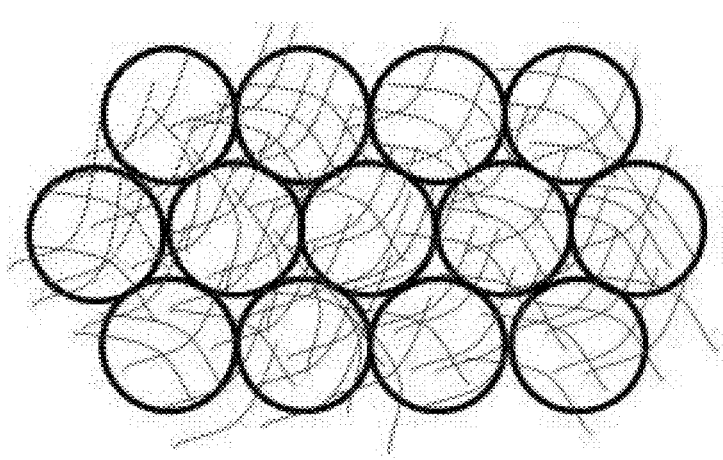
FIG. 3 is a conceptual diagram illustrating a shape in which electrode active materials and a fibrous conductive material are applied.

The conductive fiber structure layer in a frame form is formed by applying the fibrous conductive material having a size of 1 to 15 um, preferably, 5 to 10 um on the surface of the active material layer as illustrated in FIG. 3. The conductive fiber structure layer may be applied on each of the active material layers applied on both surfaces of the current corrector. When pressing the applied conductive fibrous structure, breakage of the active materials at the upper most layer caused by pressing may be minimized, and conductivity among particles may be supplemented.

The conductive fiber structure layer of step b) may be formed by applying and drying a slurry including a fibrous conductive material.

The slurry including the fibrous conductive material is characterized to include the fibrous conductive material.

The fibrous conductive material preferably has a structure in which it is easy to be tangled. In addition, an appropriate fiber diameter, an appropriate fiber length, and an appropriate surface area are required for uniform mixing with conductive materials. The fibrous conductive material satisfying the above-described conditions may be selected from a carbon nanotube or a carbon nanofiber (VGCF, vapor grown carbon fiber) having a diameter of 10 to 200 nm, a length of 3 to 100 µm, and a surface area of 20 to 200 $m^2/g$.

The fibrous conductive material preferably has a diameter of 10 to 200 nm, more preferably, 10 to 50 nm. When the diameter of the fibrous conductive material is less than 10 nm, conductivity of an electrode may be decreased, and when the diameter of the fibrous conductive material is more than 200 nm, dispersibility of the slurry may be decreased.

The fibrous conductive material preferably has a surface area (BET) of 20 to 200 $m^2/g$, more preferably, 100 to 150 $m^2/g$. When the surface area of the fibrous conductive material is less than 20 $m^2/g$, conductivity of the electrode may be reduced, and when the surface area of the fibrous conductive material is more than 200 $m^2/g$, at the time of preparing slurry, a large amount of solvent is required due to high BET, which may reduce dry efficiency.

Figure 4:
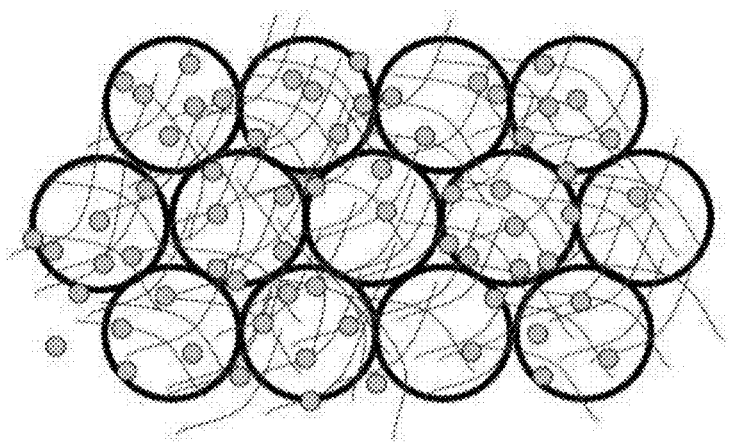
FIG. 4 is a conceptual diagram illustrating a shape in which the electrode active materials, the fibrous conductive material, and a particulate conductive material are applied.

Meanwhile, the conductive fiber structure layer may be formed by applying the fibrous conductive material and particulate conductive material having a size of 1 to 15 um, preferably, 5 to 10 um on the surface of the active material layer as illustrated in FIG. 4. The conductive fiber structure may be applied on each of the active material layers applied on both surfaces of the current corrector. When pressing the applied conductive fiber structure layer, breakage of the active materials at the upper most layer caused by pressing may be minimized, and conductivity among particles may be supplemented.

That is, the slurry including the fibrous conductive material for forming the conductive fiber structure layer may further include at least one particulate conductive material selected from the group consisting of carbon-based conductive materials, electrode active materials, transition metal oxides and phosphate-based transition metal oxides, in addition to the fibrous conductive material.

The carbon-based conductive material as the particulate conductive material may include one selected from the group consisting of graphite, acetylene black, carbon black, Ketjen black, channel black, furnace black, lamp black, thermal black and carbon fluoride, or mixtures of two or more thereof. In view of conductivity, furnace black and acetylene black are the most preferable, but the present invention is not limited thereto.

The carbon-based conductive material may have an amount of 0.01 to 50 parts by weight, more preferably, 0.1 to 10 parts by weight relative to 100 parts by weight of the fibrous conductive material. The carbon-based conductive material serves to assist conductivity of the fibrous conductive material. The carbon-based conductive material is formed by applying the carbon-based conductive material having a size of 1 to 15 um, preferably, 5 to 10 um on the surface of the active material layer as illustrated in FIG. 3.

The carbon-based conductive material may be applied on each of the active material layers applied on both surfaces of the current corrector. When pressing the applied carbon-based conductive material, breakage of the active materials at the upper most layer caused by pressing may be minimized, and conductivity among particles may be supplemented.

As the particulate conductive material, the electrode active material may include a metal active material containing lithium, a phosphate material including lithium, or the like. More specifically, an example of the metal active material containing lithium may include $LiMO_2$ (M is Al, Si, Ti, V, Cr, Mn, Fe, Co, Ni, Zn, Zr, Nb, Mo or Ba), and an example of the phosphate material including lithium may include $LiJO_4$ (J is a transition metal such as Ce, Co, Fe, Al, Ni, Mn, Cr, Ti, Si, or the like).

The electrode active material may have an amount of 0.01 to 20 parts by weight, more preferably, 0.1 to 10 parts by weight relative to 100 parts by weight of the fibrous conductive material.

The transition metal oxide as the particulate conductive material is not largely limited as long as it is an oxide including transition metals such as Al, Si, Ti, V, Cr, Mn, Fe, Co, Ni, Zn, Zr, Nb, Mo, Ba, and the like.

The transition metal oxide may have an amount of 0.01 to 20 parts by weight, more preferably, 0.1 to 10 parts by weight relative to 100 parts by weight of the fibrous conductive material. The conductive fiber structure layer in a frame form coated on the surface of the active material layer formed from a slurry prepared by including a conductive fiber structure within the above-described content range, includes transition metal oxides doped in a composite form, and is applied on the outermost part of the cathode and the anode at a thickness of several nano sizes to several microns. The applied transition metal oxide is positioned on the outermost part of the conductive fiber structure layer to improve conductivity.

Specifically, the phosphate transition metal oxide as the phosphate conductive material may include $LPO_4$(L is a transition metal such as Ce, Co, Fe, Al, Ni, Mn, Cr, Ti, Si, or the like).

The phosphate transition metal oxide may have an amount of 0.01 to 20 parts by weight, more preferably, 0.1 to 10 parts by weight relative to 100 parts by weight of the fibrous conductive material.

The slurry including the fibrous conductive material includes a solvent for mixing and dispersion. The solvent may be any general solvent known in the art, and may preferably include N-methyl-2-pyrrolidone (NMP, boiling point: 202° C.), dimethylformamide (DMF, boiling point: 153° C.), dimethylacetamide (boiling point: 165° C.), water (boiling point: 100° C.), methyl ethyl ketone (boiling point: 79.5° C.), tetrahydrofuran (boiling point: 66° C.), acetone (boiling point: 56.3° C.), ethanol (boiling point: 78.3° C.), ethyl acetate (boiling point: 76.8° C.), and the like. The solvent may be applied with variously desirable concentrations relative to 100 parts by weight of solid content in slurry. Specifically, the solvent may have an amount of 10 parts by weight to 1,000 parts by weight, but the amount of the solvent is not limited thereto.

In addition to the above described materials, a dispersing agent may be used as needed. The dispersing agent may be anionic, nonionic or cationic surfactant; or a polymer dispersing agent. When considering excellent affinity according to structural characteristics of the fibrous conductive material according to the present invention, a polymeric dispersing agent having a functional group including an aromatic ring and/or an aliphatic ring is preferred.

As the polymeric dispersing agent, various kinds of compounds may be used, preferably, a polycarbonate-based polymer dispersing agent having a plurality of carboxylic acid groups in a molecule, a polyamine-based polymer dispersing agent having a plurality of amino groups in a molecule, a polymer dispersing agent having a plurality of amide groups in a molecule, or a polymer dispersing agent containing a plurality of polycyclic aromatic compounds in a molecule. The polymer dispersing agent containing a plurality of polycyclic aromatic compounds may be a copolymer of a vinyl monomer having pyrene or quinacridone skeleton and various monomers.

These dispersing agents may be used alone or in combination of two or more thereof. When the dispersing agent is used, a preferable amount of the dispersing agent may be 0.05 to 20 parts by weight, more preferably, 0.05 to 10 parts by weight relative to 100 parts by weight of a slurry in order to reduce a slurry viscosity while performing appropriate dispersion of the slurry.

In addition, when the dispersing agent remains in a composite material for a cathode, the dispersing agent itself becomes a resistant component, which inhibits a high-rate discharge performance of a battery. Accordingly, it is preferable to remove the dispersing agent. A method of removing the dispersing agent includes washing or decomposition by heat treatment.

In preparing the slurry including the fibrous conductive material, it is preferable to perform deaggregation (pre-dispersion) before dispersion. That is, the fibrous conductive materials such as a carbon nanofiber, and the like, are generally aggregated in a thread shape, such that it is preferable to perform deaggregation by mechanical disintegration to some extent before dispersing the fibrous conductive materials with the dispersing agent. The deaggregation is preferably performed by a dry grinder, more specifically, an impact type grinder such as a rotor speed mill, a hammer mill, or the like, a dry type media grinder such as a dry power ball mill, a dry vibration ball mill, a dry planetary mill, a media stirring mill, or the like, an air flow type grinder such as a jet mill, or the like. Among them, the impact type grinder such as a rotor speed mill, a hammer mill, or the like, is preferred in view of appropriate grinding.

In addition, it is more preferable to forcibly disperse the slurry using a disperser at the time of preparing the slurry. Examples of the disperser may include a ultrasonic disperser, a stirring type disperser, a high-speed rotating shear type disperser, a mill type disperser, a high pressure jet type disperser, and the like. When the disperser is used for forcible dispersion, the ultrasonic disperser and the high pressure jet type disperser are preferably used.

The slurry including the fibrous conductive material prepared as above is applied and dried on a surface of the active material layer of the current collector on which the active material layer is formed, thereby forming the conductive fiber structure layer in a frame form, wherein it is preferable to apply and dry the slurry in a state in which the active material layer is dried.

The slurry including the fibrous conductive material may be applied by various methods known in the art, including doctor blade, and the like, in addition to spraying, die casting, comma coating, and screen printing.

Here, a thickness at which the slurry including the fibrous conductive material is applied is preferably 3 to 50 μm.

At the time of drying the slurry including the fibrous conductive material, a drying temperature is preferably 50 to 200° C., more preferably, 100 to 150° C. When the drying temperature is less than 50° C., time for the drying is increased, which may reduce economical efficiency, and when the drying temperature is more than 200° C., the slurry is carbonized or rapidly dried, which may increase resistance of electrodes. The drying is a process of evaporating solvents by passing the slurry through a region with hot air, and is performed under atmospheric pressure.

Lastly, step c) is described.

Step c) is a step of pressing the current collector on which the conductive fiber structure layer in a frame form is formed, wherein the pressing is performed by a roll press or a plate press. Pressing strength may be performed by high densification with a pressure of 10 kg/cm$^2$ to 100 ton/cm$^2$.

The present invention may provide a lithium electrode having high density by the pressing, and the lithium electrode may prevent breakage of the active material layers since the conductive fiber structure layer in a frame form formed on the surface of the active material layer of each electrode is subjected to the pressing step while being in contact to the roll press. Therefore, a lithium secondary battery having long lifespan and high-rate charge and discharge characteristics while maintaining excellent electronic conductivity of the active materials, may be provided.

The secondary battery is fabricated by general technology known in the art, specifically, the lithium battery may be fabricated by stacking a cathode and an anode fabricated according to the present invention, with a separator interposed therebetween, and injecting an electrolyte thereinto, followed by sealing.

Hereinafter, preferred exemplary embodiments of the present invention are provided by way of example so that the technical idea of the present invention is understood by those skilled in the art. However, the present invention is not limited to the following Examples.

[EXAMPLE 1] FABRICATION OF LITHIUM CATHODE

1. Preparation of Slurry Including Cathode Active Material and Formation of Cathode Active Material Layer A slurry having a final solid content of 65% was prepared by mixing 94% LiCoO$_2$, 3% acetylene black, 3% polyvinylidene fluoride, and N-methyl-2-pyrrolidone.

The slurry was coated on an aluminum foil having a thickness of 15 μm at a coating thickness of 90 μm by casting, followed by drying at 140° C. for 20 minutes, thereby forming a cathode active material layer.

2. Preparation of Slurry Including Fibrous Conductive Material and Formation of Conductive Fiber Structure Layer In order to form a frame layer including a conductive fiber structure on a surface of the cathode active material layer formed as above, a slurry including a fibrous conductive material was prepared. The slurry including a fibrous conductive material was prepared by mixing 94% carbon nanofiber (average diameter of 100 nm, average length of 50 μm, and average surface area of 100 m$^2$/g) with 2% carboxymethylcellulose (CMC) and 4% styrene butadiene rubber (SBR) each being a binder, and adding pure water as a solvent thereto, followed by ultrasonic dispersion. The slurry including a fibrous conductive material was coated on a surface of the cathode active material layer at a coating thickness of 10 μm by casting, followed by drying at 140° C. for 10 minutes, thereby forming a conductive fiber structure layer in a frame form.

3. Fabrication of Final Lithium Cathode

A lithium cathode having a final thickness of 100 μm was fabricated by cutting a current collector on which the conductive fiber structure layer is formed into a predetermined size (20 mm*15 mm), and pressing the current collector by a pressure of 100 kg/cm$^2$ using a roll press.

[EXAMPLE 2] FABRICATION OF LITHIUM ANODE

1. Preparation of Slurry Including Anode Active Material and Formation of Anode Active Material Layer A slurry including an anode active material having a final solid content of 45% was prepared by mixing 96% graphite, 4% polyvinylidene fluoride, and N-methyl-2-pyrrolidone.

The slurry was coated on a copper foil having a thickness of 12 μm at a coating thickness of 70 μm by casting, followed by drying at 140° C. for 20 minutes, thereby forming an anode active material layer.

2. Preparation of Slurry Including Fibrous Conductive Material and Formation of Conductive Fiber Structure Layer In order to form a frame layer including a conductive fiber structure on a surface of the anode active material layer formed as above, a slurry including a fibrous conductive material was prepared. The slurry including a fibrous conductive material was prepared by mixing 94% carbon nanofiber (average diameter of 100 nm, average length of 50 μm, and average surface area of 100 m$^2$/g) with 2% carboxymethylcellulose (CMC) and 4% styrene butadiene rubber (SBR) each being a binder, and adding pure water as a solvent thereto, followed by ultrasonic dispersion. The slurry including a fibrous conductive material was coated on a surface of the anode active material layer at a coating thickness of 10 μm by casting, followed by drying at 140° C. for 10 minutes, thereby forming a conductive fiber structure layer in a frame form.

3. Fabrication of Final Lithium Anode

A lithium anode having a final thickness of 90 μm was fabricated by cutting a current collector on which the conductive fiber structure layer is formed into a predetermined size (20 mm*15 mm), and pressing the current collector by a pressure of 100 kg/cm$^2$ using a roll press.

[EXAMPLE 3] FABRICATION OF LITHIUM SECONDARY BATTERY CELL

A lithium secondary battery cell was fabricated by stacking the lithium cathode of Example 1, a separator (Celgard) #2400), the lithium anode of Example 2, and injecting a solution of PC:EMC (volume ratio of 1:1) in which 1M LiPF$_6$ is dissolved thereinto, followed by sealing.

[EXAMPLE 4] FABRICATION OF LITHIUM CATHODE

1. Preparation of Slurry Including Cathode Active Material and Formation of Cathode Active Material Layer A slurry having a final solid content of 65% was prepared by mixing 94% LiCoO$_2$, 3% acetylene black, 3% polyvinylidene fluoride, and N-methyl-2-pyrrolidone.

The slurry was coated on an aluminum foil having a thickness of 15 μm at a coating thickness of 90 μm by casting, followed by drying at 140° C. for 20 minutes, thereby forming a cathode active material layer.

2. Preparation of Slurry Including Fibrous Conductive Material and Formation of Conductive Fiber Structure Layer In order to form a frame layer including a conductive fiber structure on a surface of the cathode active material layer formed as above, a slurry including a fibrous conductive material was prepared. The slurry including a fibrous conductive material was prepared by mixing 94% carbon nanofiber (average diameter of 100 nm, average length of 50 μm, and average surface area of 100 m$^2$/g), 3% acetylene black, with 1% carboxymethylcellulose (CMC) and 2% styrene butadiene rubber (SBR) each being a binder, and adding pure water as a solvent thereto, followed by ultrasonic dispersion. The slurry including a fibrous conductive material was coated on a surface of the cathode active material layer at a coating thickness of 10 μm by casting, followed by drying at 140° C. for 10 minutes, thereby forming a conductive fiber structure layer in a frame form.

3. Fabrication of Final Lithium Cathode

A lithium cathode having a final thickness of 100 μm was fabricated by cutting a current collector on which the conductive fiber structure layer is formed into a predetermined size (20 mm*15 mm), and pressing the current collector at a pressure of 100 kg/cm$^2$ using a roll press.

[EXAMPLE 5] FABRICATION OF LITHIUM ANODE

1. Preparation of Slurry Including Anode Active Material and Formation of Anode Active Material Layer A slurry including an anode active material having a final solid content of 45% was prepared by mixing 96% graphite, 4% polyvinylidene fluoride, and N-methyl-2-pyrrolidone.

The slurry was coated on a copper foil having a thickness of 12 μm at a coating thickness of 70 μm by casting, followed by drying at 140° C. for 20 minutes, thereby forming an anode active material layer.

2. Preparation of Slurry Including Fibrous Conductive Material and Formation of Conductive Fiber Structure Layer In order to form a frame layer including a conductive fiber structure on a surface of the anode active material layer formed as above, a slurry including a fibrous conductive material was prepared. The slurry including a fibrous conductive material was prepared by mixing 94% carbon nanofiber (average diameter of 100 nm, average length of 50 μm, and average surface area of 100 m$^2$/g), 3% acetylene black, with 1% carboxymethylcellulose (CMC) and 2% styrene butadiene rubber (SBR) each being a binder, and adding pure water as a solvent thereto, followed by ultrasonic dispersion. The slurry including a fibrous conductive material was coated on a surface of the anode active material layer at a coating thickness of 10 μm by casting, followed by drying at 140° C. for 10 minutes, thereby forming a conductive fiber structure layer in a frame form.

3. Fabrication of Final Lithium Anode

A lithium anode having a final thickness of 90 μm was fabricated by cutting a current collector on which the conductive fiber structure layer is formed into a predetermined size (20 mm*15 mm), and pressing the current collector by a pressure of 100 kg/cm$^2$ using a roll press.

[EXAMPLE 6] FABRICATION OF LITHIUM SECONDARY BATTERY CELL

A lithium secondary battery cell was fabricated by stacking the lithium cathode of Example 1, a separator (Celgard) #2400), the lithium anode of Example 2, and injecting a solution of PC:EMC (volume ratio of 1:1) in which 1M LiPF$_6$ is dissolved thereinto, followed by sealing.

[EXAMPLE 7] FABRICATION OF LITHIUM CATHODE

1. Preparation of Slurry Including Cathode Active Material and Formation of Cathode Active Material Layer A slurry having a final solid content of 65% was prepared by mixing 94% LiCoO$_2$, 3% acetylene black, 3% polyvinylidene fluoride, and N-methyl-2-pyrrolidone.

The slurry was coated on an aluminum foil having a thickness of 15 μm at a coating thickness of 90 μm by casting, followed by drying at 140 for 20 minutes, thereby forming a cathode active material layer.

2. Preparation of Slurry Including Fibrous Conductive Material and Formation of Conductive Fiber Structure Layer In order to form a frame layer including a conductive fiber structure on a surface of the cathode active material layer formed as above, a slurry including a fibrous conductive material was prepared. The slurry including a fibrous conductive material was prepared by mixing 95% carbon nanofiber (average diameter of 100 nm, average length of 50 μm, and average surface area of 100 m$^2$/g), 2% acetylene black, with 1% carboxymethylcellulose (CMC) and 2% styrene butadiene rubber (SBR) each being a binder, and adding pure water as a solvent thereto, followed by ultrasonic dispersion. The slurry including a fibrous conductive material was coated on a surface of the cathode active material layer at a coating thickness of 10 μm by casting, followed by drying at 140° C. for 10 minutes, thereby forming a conductive fiber structure layer in a frame form.

3. Fabrication of Final Lithium Cathode

A lithium cathode having a final thickness of 100 μm was fabricated by cutting a current collector on which the conductive fiber structure layer is formed into a predetermined size (20 mm*15 mm), and pressing the current collector by a pressure of 100 kg/cm$^2$ using a roll press.

[EXAMPLE 8] FABRICATION OF LITHIUM ANODE

1. Preparation of Slurry Including Anode Active Material and Formation of Anode Active Material Layer A slurry including an anode active material having a final solid content of 45% was prepared by mixing 96% graphite, 4% polyvinylidene fluoride, and N-methyl-2-pyrrolidone.

The slurry was coated on a copper foil having a thickness of 12 μm at a coating thickness of 70 μm by casting, followed by drying at 140° C. for 20 minutes, thereby forming an anode active material layer.

2. Preparation of Slurry Including Fibrous Conductive Material and Formation of Conductive Fiber Structure Layer In order to form a frame layer including a conductive fiber structure on a surface of the anode active material layer formed as above, a slurry including a fibrous conductive material was prepared. The slurry including a fibrous conductive material was prepared by mixing 95% carbon nanofiber (average diameter of 100 nm, average length of 50 μm, and average surface area of 100 m$^2$/g), 2% acetylene black, with 1% carboxymethylcellulose (CMC) and 2% styrene butadiene rubber (SBR) each being a binder, and adding pure water as a solvent thereto, followed by ultrasonic dispersion. The slurry including a fibrous conductive material was coated on a surface of the anode active material layer at a coating thickness of 10 μm by casting, followed by drying at 140° C. for 10 minutes, thereby forming a conductive fiber structure layer in a frame form.

3. Fabrication of Final Lithium Anode

A lithium anode having a final thickness of 90 μm was fabricated by cutting a current collector on which the conductive fiber structure layer is formed into a predetermined size (20 mm*15 mm), and pressing the current collector by a pressure of 100 kg/cm² using a roll press.

[EXAMPLE 9] FABRICATION OF LITHIUM SECONDARY BATTERY CELL

A lithium secondary battery cell was fabricated by stacking the lithium cathode of Example 1, a separator (Celgard) #2400), the lithium anode of Example 2, and injecting a solution of PC:EMC (volume ratio of 1:1) in which 1M $LiPF_6$ is dissolved thereinto, followed by sealing.

[EXAMPLE 10] FABRICATION OF LITHIUM CATHODE

1. Preparation of Slurry Including Cathode Active Material and Formation of Cathode Active Material Layer A slurry having a final solid content of 65% was prepared by mixing 94% $LiCoO_2$, 3% acetylene black, 3% polyvinylidene fluoride, and N-methyl-2-pyrrolidone.

The slurry was coated on an aluminum foil having a thickness of 15 μm at a coating thickness of 90 μm by casting, followed by drying at 140° C. for 20 minutes, thereby forming a cathode active material layer.

2. Preparation of Slurry Including Fibrous Conductive Material and Formation of Conductive Fiber Structure Layer In order to form a frame layer including a conductive fiber structure on a surface of the cathode active material layer formed as above, a slurry including a fibrous conductive material was prepared. The slurry including a fibrous conductive material was prepared by mixing 96% carbon nanofiber (average diameter of 100 nm, average length of 50 μm, and average surface area of 100 m²/g), 1% acetylene black, with 1% carboxymethylcellulose (CMC) and 2% styrene butadiene rubber (SBR) each being a binder, and adding pure water as a solvent thereto, followed by ultrasonic dispersion. The slurry including a fibrous conductive material was coated on a surface of the cathode active material layer at a coating thickness of 10 μm by casting, followed by drying at 140° C. for 10 minutes, thereby forming a conductive fiber structure layer in a frame form.

3. Fabrication of Final Lithium Cathode

A lithium cathode having a final thickness of 100 μm was fabricated by cutting a current collector on which the conductive fiber structure layer is formed into a predetermined size (20 mm*15 mm), and pressing the current collector by a pressure of 100 kg/cm² using a roll press.

[EXAMPLE 11] FABRICATION OF LITHIUM ANODE

1. Preparation of Slurry Including Anode Active Material and Formation of Anode Active Material Layer A slurry including an anode active material having a final solid content of 45% was prepared by mixing 96% graphite, 4% polyvinylidene fluoride, and N-methyl-2-pyrrolidone.

The slurry was coated on a copper foil having a thickness of 12 μm at a coating thickness of 70 μm by casting, followed by drying at 140° C. for 20 minutes, thereby forming an anode active material layer.

2. Preparation of Slurry Including Fibrous Conductive Material and Formation of Conductive Fiber Structure Layer In order to form a frame layer including a conductive fiber structure on a surface of the anode active material layer formed as above, a slurry including a fibrous conductive material was prepared. The slurry including a fibrous conductive material was prepared by mixing 96% carbon nanofiber (average diameter of 100 nm, average length of 50 μm, and average surface area of 100 m²/g), 1% acetylene black, with 1% carboxymethylcellulose (CMC) and 2% styrene butadiene rubber (SBR) each being a binder, and adding pure water as a solvent thereto, followed by ultrasonic dispersion. The slurry including a fibrous conductive material was coated on a surface of the anode active material layer at a coating thickness of 10 μm by casting, followed by drying at 140° C. for 10 minutes, thereby forming a conductive fiber structure layer in a frame form.

3. Fabrication of Final Lithium Anode

A lithium anode having a final thickness of 90 μm was fabricated by cutting a current collector on which the conductive fiber structure layer is formed into a predetermined size (20 mm*15 mm), and pressing the current collector by a pressure of 100 kg/cm² using a roll press.

[EXAMPLE 12] FABRICATION OF LITHIUM SECONDARY BATTERY CELL

A lithium secondary battery cell was fabricated by stacking the lithium cathode of Example 1, a separator (Celgard) #2400), the lithium anode of Example 2, and injecting a solution of PC:EMC (volume ratio of 1:1) in which 1M $LiPF_6$ is dissolved thereinto, followed by sealing.

Table 1 below summarizes the conductive fiber structures of Examples, and contents of other materials.

TABLE 1

| | Conductive Material Parameter | | | | | | |
|---|---|---|---|---|---|---|---|
| | Fibrous Conductive Material (%) | Particulate Conductive Material (%) | CMC (%) | SBR (%) | Solid (%) | Thickness (um) | Note |
| Example 1 | 94 | — | 2 | 4 | 65 | 10 | Cathode + Fibrous Conductive Layer |
| Example 2 | 94 | — | 2 | 4 | 45 | 10 | Anode + Fibrous Conductive Layer |
| Example 3 | Fabrication of Battery Using Examples 1 and 2 | | | | | | |
| Example 4 | 94 | 3 | 1 | 2 | 65 | 10 | Cathode + Fibrous + Particulate Conductive Layer |

TABLE 1-continued

| | Conductive Material Parameter | | | | | | |
|---|---|---|---|---|---|---|---|
| | Fibrous Conductive Material (%) | Particulate Conductive Material (%) | CMC (%) | SBR (%) | Solid (%) | Thickness (um) | Note |
| Example 5 | 94 | 3 | 1 | 2 | 45 | 10 | Cathode + Fibrous + Particulate Conductive Layer |
| Example 6 | Fabrication of Battery Using Examples 4 and 5 | | | | | | |
| Example 7 | 95 | 2 | 1 | 2 | 65 | 10 | Cathode + Fibrous + Particulate Conductive Layer |
| Example 8 | 95 | 2 | 1 | 2 | 45 | 10 | Cathode + Fibrous + Particulate Conductive Layer |
| Example 9 | Fabrication of Battery Using Examples 7 and 8 | | | | | | |
| Example 10 | 96 | 1 | 1 | 2 | 65 | 10 | Cathode + Fibrous + Particulate Conductive Layer |
| Example 11 | 96 | 1 | 1 | 2 | 45 | 10 | Cathode + Fibrous + Particulate Conductive Layer |
| Example 12 | Fabrication of Battery Using Examples 7 and 8 | | | | | | |

[COMPARATIVE EXAMPLE 1] FABRICATION OF LITHIUM CATHODE

A lithium cathode was fabricated by the same method as Example 1 above including the pressing using a roll press, except for the step of forming the conductive fiber structure layer.

[COMPARATIVE EXAMPLE 2] FABRICATION OF LITHIUM ANODE

A lithium anode was fabricated by the same method as Example 2 above including the pressing using a roll press, except for the step of forming the conductive fiber structure layer.

[COMPARATIVE EXAMPLE 3] FABRICATION OF LITHIUM SECONDARY BATTERY CELL

A lithium secondary battery cell was fabricated by stacking the lithium cathode of Comparative Example 1, a separator (Celgard) #2400, the lithium anode of Comparative Example 2, and injecting a solution of PC:EMC (volume ratio of 1:1) in which 1M $LiPF_6$ is dissolved thereinto, followed by sealing.

Figure 2:
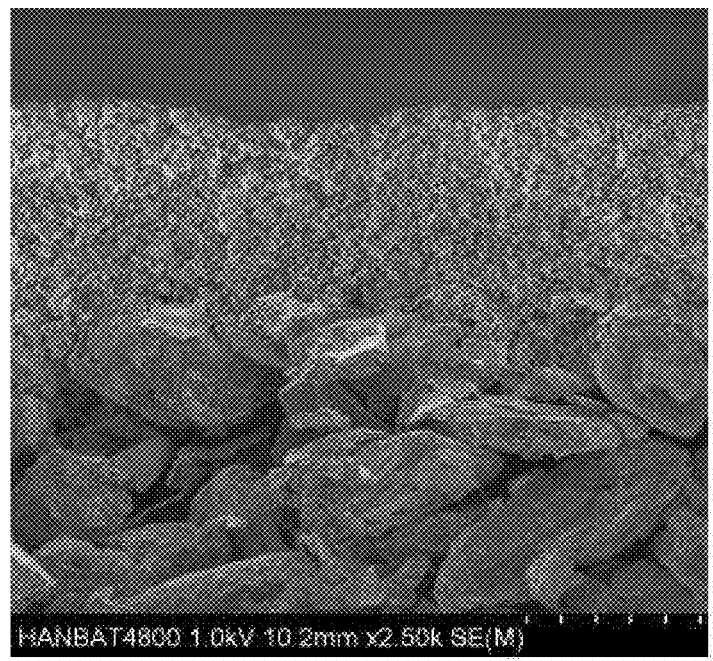
FIG. 2 is an image illustrating a cross section of an anode in which a conductive fiber structure layer in a frame form is formed on an active material layer according to an exemplary embodiment of the present invention.

It was confirmed from the lithium electrodes fabricated by Examples 1 and 2 that breakage of the active materials was reduced as illustrated in SEM image of FIG. 2. Performance of each of the lithium secondary battery cells of Example 3 and Comparative Example 3 was evaluated as follows.

<Evaluation of Physical Properties>

Charge-discharge test was performed in each of the lithium secondary cells of Example 3 and Comparative Example 3 at an environmental temperature of 60° C. Charge-discharge cycles were repeated by charging and discharging both having a current density of 0.35 mA/cm², wherein charging was maintained at 4.2 V for 1 hour after arriving at 4.2 V, and discharging was performed up to 3.0 V. In addition, deterioration degree of the cell was evaluated by measuring discharge capacity retention rate after 500 cycles, cell resistance values at 23° C. after 500 cycles and gas production amounts in the cell after 500 cycles. The discharge capacity retention rate is expressed as a percentage of the discharge capacity after 500 cycles to initial discharge capacity. The evaluation results were illustrated in Table 2. In Comparative Example 3, the discharge capacity retention rate after 500 cycles was 82%, the cell resistance increase rate after 500 cycles was 16%, and the gas production amount after 500 cycles was 1.3 ml.

TABLE 2

| | Capacity Retention Rate After 500 Cycles (%) | Resistance Increase Rate After 500 Cycles (%) | Gas Production Amount After 500 Cycles (ml) |
|---|---|---|---|
| Example 3 | 94 | 8 | 0.7 |
| Comparative Example 3 | 82 | 16 | 1.3 |
| Example 6 | 98 | 7 | 0.3 |
| Example 9 | 98 | 5 | 0.2 |
| Example 12 | 91 | 12 | 0.9 |

The fabricating method of the lithium electrode according to the present invention is to prevent breakage of electrode active materials caused by a press process, which includes forming a conductive fiber structure layer in a frame form before the press process, thereby preventing the breakage of the electrode active materials. Therefore, the present invention may provide a lithium electrode capable of maintaining electronic conductivity among active material particles of the electrode active materials and having excellent long lifespan and high-rate charge and discharge characteristics, and a lithium secondary battery including the same.

What is claimed is:

1. A fabricating method of a lithium electrode, comprising:
   a) forming an active material layer on one surface or active material layers on both surfaces of a current collector;
   b) forming a conductive fiber structure layer in a frame form on a surface of the active material layer; and
   c) pressing the current collector on which the conductive fiber structure layer in a frame form is formed,
   wherein the active material layer of step a) is formed by applying and drying a slurry including active electrode active materials, a conductive material, a binder, and a solvent.

2. The fabricating method of claim 1, wherein the conductive fiber structure layer of step b) is formed by applying and drying a slurry including a fibrous conductive material.

3. The fabricating method of claim 2, wherein the fibrous conductive material is a carbon nanotube or a carbon nanofiber having a diameter of 10 to 200 nm, a length of 3 to 100 μm, and a surface area of 20 to 200 $m^2/g$.

4. The fabricating method of claim 2, wherein the slurry including the fibrous conductive material further includes at least one particulate conductive material selected from the group consisting of carbon-based conductive materials, electrode active materials, transition metal oxides and phosphate-based transition metal oxides.

5. The fabricating method of claim 4, wherein the carbon-based conductive material includes one selected from the group consisting of graphite, acetylene black, carbon black, Ketjen black, channel black, furnace black, lamp black, thermal black and carbon fluoride, or mixtures of two or more thereof.

6. The fabricating method of claim 1, wherein the pressing of step c) is performed by high densification with a pressure of 10 $kg/cm^2$ to 100 $ton/cm^2$ using a roll press or a plate press.

7. A lithium electrode fabricated by the fabricating method of claim 1.

8. A lithium secondary battery comprising the lithium electrode of claim 7.

* * * * *